United States Patent
Yeung et al.

(10) Patent No.: US 9,350,665 B2
(45) Date of Patent: May 24, 2016

(54) CONGESTION MITIGATION AND AVOIDANCE

(75) Inventors: Derek Man-Kit Yeung, Fremont, CA (US); Ali Sajassi, San Ramon, CA (US); Hong Zhang, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 197 days.

(21) Appl. No.: 13/601,957

(22) Filed: Aug. 31, 2012

(65) Prior Publication Data

US 2014/0064082 A1 Mar. 6, 2014

(51) Int. Cl.
*H04J 1/16* (2006.01)
*H04L 12/803* (2013.01)

(52) U.S. Cl.
CPC .................... *H04L 47/125* (2013.01)

(58) Field of Classification Search
CPC ................. H04L 1/00; H04L 47/125
USPC ........................................... 370/235
See application file for complete search history.

(56) References Cited

U.S. PATENT DOCUMENTS

| | | | |
|---|---|---|---|
| 2002/0136163 A1* | 9/2002 | Kawakami et al. | 370/229 |
| 2005/0120140 A1* | 6/2005 | Bodlaender | H04L 29/06 709/249 |
| 2005/0190697 A1* | 9/2005 | Dohi et al. | 370/235 |
| 2006/0029006 A1* | 2/2006 | Oster | 370/299 |
| 2007/0053292 A1* | 3/2007 | DePaul et al. | 370/235 |
| 2008/0273465 A1* | 11/2008 | Gusat et al. | 370/236 |
| 2009/0207737 A1* | 8/2009 | Pappu et al. | 370/238 |
| 2010/0299313 A1* | 11/2010 | Orsini | H04L 9/085 707/652 |
| 2011/0090797 A1* | 4/2011 | Beecroft | 370/237 |
| 2012/0026897 A1* | 2/2012 | Guichard | H04L 43/028 370/252 |
| 2013/0201316 A1* | 8/2013 | Binder | H04L 67/12 348/77 |
| 2013/0286846 A1* | 10/2013 | Atlas et al. | 370/236 |
| 2015/0074264 A1* | 3/2015 | Izhak-Ratzin | G06F 17/30194 709/224 |

* cited by examiner

*Primary Examiner* — Asad Nawaz
*Assistant Examiner* — Syed S Ali (57) ABSTRACT

In one embodiment, a method is provided for congestion mitigation. In this method, a congestion level of data flows along a path is monitored relative to a threshold. Here, each data flow is associated with a flow identifier. Based on detection that the congestion level exceeds the threshold, the flow identifier of a number (e.g., one or more) of the data flows is changed to a different flow identifier. This change results in the number of the data flows redirected to a different path. In an alternate embodiment, another method is provided for congestion avoidance. In this method, a data flow transmitted along a single path is received, and the data flow is split into multiple micro data flows. A different flow identifier is then assigned to each micro data flow. This change results in the multiple micro data flows distributed along multiple different paths.

20 Claims, 9 Drawing Sheets

CONGESTION MITIGATION AND AVOIDANCE

FIELD

The present disclosure relates generally to communication systems.

BACKGROUND

Data packets are transmitted within a network system, such as a Metro Ethernet network. Congestion in network systems can occur as a result of traffic aggregation on a network node exceeding the throughput of that network node. There are a variety of existing mechanisms that support load balancing of data traffic flows for better link utilization and congestion avoidance. However congestion can still occur with application of such existing load balancing mechanisms.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of an example embodiment of the present disclosure. It will be evident, however, to one skilled in the art that the present disclosure may be practiced without these specific details.

Overview

A method is provided for congestion mitigation. In this method, a congestion level of data flows along a path is monitored relative to a threshold. Here, each data flow is associated with a flow identifier. Based on detection that the congestion level exceeds the threshold, the flow identifier of a number (e.g., at least one of a plurality) of the data flows is changed to a different flow identifier. This change results in the number of the data flows being redirected to a different path.

According to various exemplary embodiments, each flow identifier uniquely corresponds to (or implies) a specific path. Thus, the path followed by a data flow may be changed, by changing the flow identifier associated with that data flow. Put another way, if a flow identifier associated with a data flow is changed to a different flow identifier, this results in the data flow being redirected to a different path corresponding to the different flow identifier. Moreover, the same particular flow identifier may be associated with multiple data flows, resulting in each of the multiple data flows being redirected to the same path that corresponds to the same particular flow identifier.

Another method is provided for congestion avoidance. In this method, a data flow transmitted along a single path is received, and the data flow is split into a plurality of micro data flows. A different flow identifier is then assigned to each of the plurality of micro data flows. This change results in the plurality of micro data flows distributed along a plurality of different paths.

Example Embodiments

Figure 1:
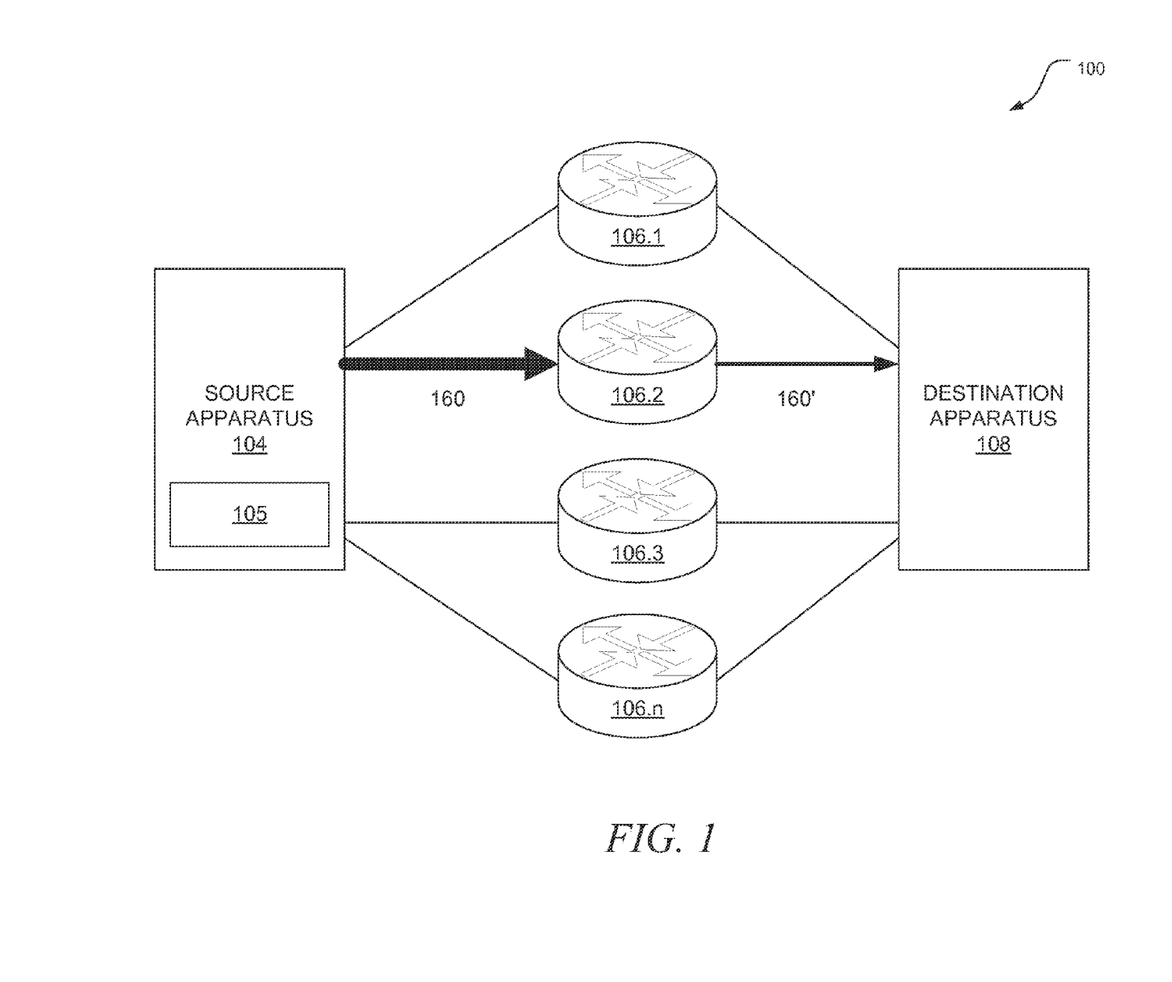
FIG. 1 is a block diagram depicting an example network system for communicating data packets, in accordance with an example embodiment.

FIG. 1 is a block diagram depicting a network system 100 for communicating data packets, in accordance with an example embodiment. The network system 100 includes edge apparatuses 104 and 108 and switching apparatuses 106.1-106.*n*. In one example, the network system 100 can be an Ethernet network, which can be configured to support Fibre Channel networks, such as a storage area network (SAN). SAN is a high-speed network that enables establishment of direct connections between storage system and its storage devices. SAN may thus be viewed as an extension to a storage bus and, as such, an operating system of storage system enables access to stored data using block-based access protocols over an extended bus. In this context, the extended bus can be embodied as Fibre Channel, Computer System Interface (SCSI), Internet SCSI (iSCSI) or other network technologies.

In reference to FIG. 1, the source apparatus 104 is transmitting a flow of data packets to destination apparatus 108 by way of switching apparatus 106.2. In general, the switching apparatuses 106.1-106.*n* are computer networking apparatuses that connect various network segments. A flow (or "data flow") refers to a sequence of data packets from a particular source (e.g., source apparatus 104) to a particular destination (e.g., destination apparatus 108) for which the source requests special handling by the intervening switching apparatuses (e.g., switching apparatuses 106.1-106.*n*). In this example, the flow of data packets 160 and 160' from the source apparatus 104 to destination apparatus 108 can become congested because, for example, the flow 160 into the switching apparatus 106.2 exceeds a throughput of the switching apparatus 106.2, thereby resulting in a reduced flow 106' to the destination apparatus 108.

In the example embodiment depicted in FIG. 1, the source apparatus 104 includes a congestion mitigation and avoidance module 105. As explained in detail below, the congestion mitigation and avoidance module 105 is configured to mitigate congestion by redirecting a portion of the flow 160 to a different path, such as path by way of switching apparatus 106.3, A "path," as used herein, refers to a set of links traversed by a data packet between a source (e.g., source apparatus 104) and a destination (e.g., destination apparatus 108), Additionally, the congestion mitigation and avoidance module 105 can also avoid congestion by breaking the flow 160 into multiple micro flows, which are also explained in detail below.

Figure 2:
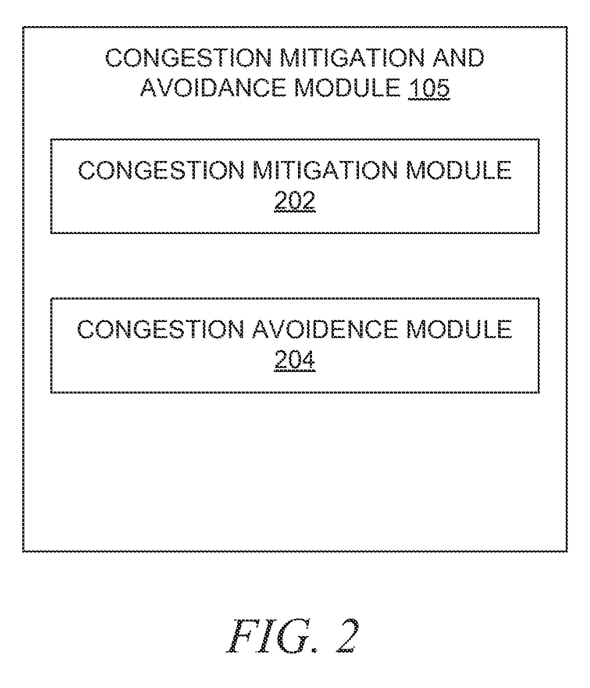
FIG. 2 is a block diagram depicting an example embodiment of a congestion mitigation and avoidance module.

FIG. 2 is a block diagram depicting an example embodiment of a congestion mitigation and avoidance module 105. It should be appreciated that the congestion mitigation and avoidance module 105 may be deployed in a source edge device, such as a router, switch, integrated access device (IADs), multiplexer, or a wide area network (WAN) access device. For example, the congestion mitigation and avoidance module 105 may form a part of the source apparatus 104 depicted in FIG. 1. In an alternate embodiment, the congestion mitigation and avoidance module 105 may form a part of a host apparatus (not shown in FIG. 1) that is in communication with the source apparatus 104. Referring to FIG. 2, in various embodiments, the congestion mitigation and avoidance module 105 may be used to implement computer programs, logic, applications, methods, processes, or software to mitigate and avoid congestion, as described in more detail below.

In the embodiment depicted in FIG. 2, the congestion mitigation and avoidance module 105 includes a congestion mitigation module 202 and a congestion avoidance module 204. In general, the congestion mitigation module 202 is configured to mitigate congestion by redirecting or diverting a portion of a single flow to a different path. As explained in more detail below, the congestion mitigation module 202 can redirect a portion of the flow by changing flow identifiers.

The congestion avoidance module 204 is configured to avoid congestion by breaking a single flow into multiple micro flows. As explained in more detail below, the congestion avoidance module 204 then distributes the micro flows to multiple paths, the distribution of which thereby reduces the likelihood of further congestion.

It should be appreciated that in other embodiments, the congestion mitigation and avoidance module 105 may include fewer or more modules apart from those shown in FIG. 2. The modules 105, 202, and 204 may be in the form of software that is processed by a processor. In another example, as explained in more detail below, the modules 105, 202, and 204 may be in the form of firmware that is processed by application specific integrated circuits (ASIC), which may be integrated into a circuit board. Alternatively, the modules 105, 202, and 204 may be in the form of one or more logic blocks included in a programmable logic device (e.g., a field programmable gate array). The described modules 105, 202, and 204 may be adapted, and/or additional structures may be provided, to provide alternative or additional functionalities beyond those specifically discussed in reference to FIG. 2. Examples of such alternative or additional functionalities will be discussed in reference to the flow diagrams discussed below.

Figure 3:
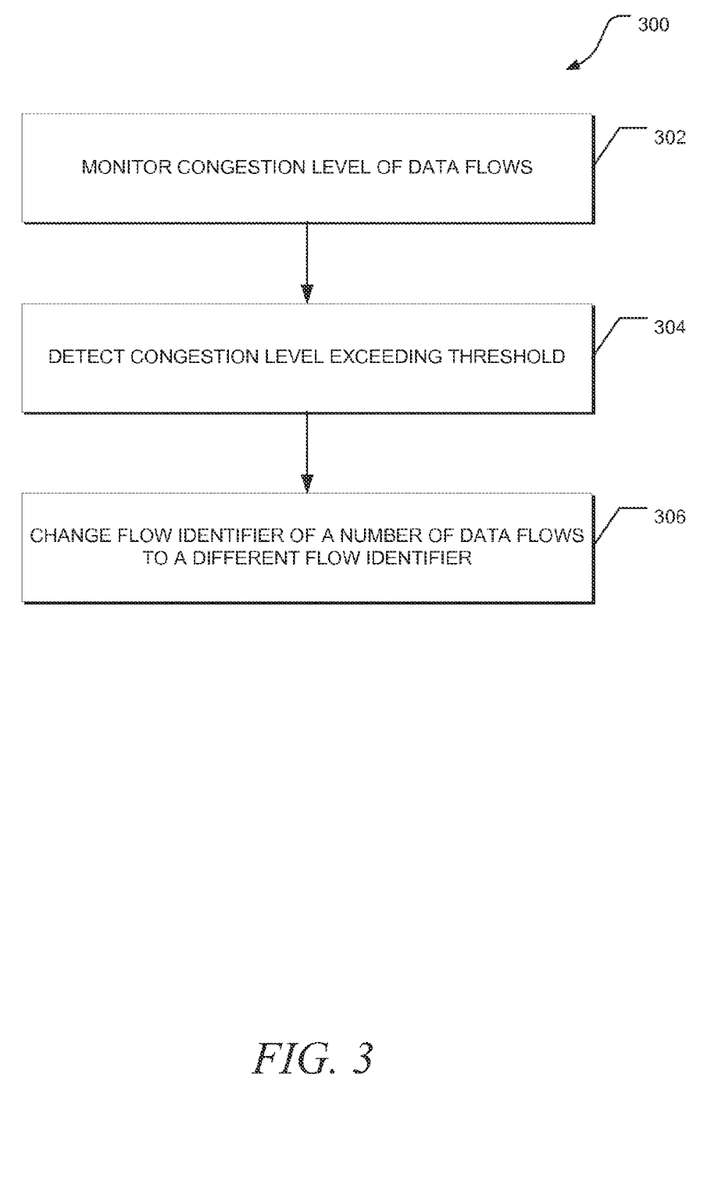
FIG. 3 is a flow diagram of a general overview of a method, in accordance with an example embodiment, for mitigating congestion.

FIG. 3 is a flow diagram of a general overview of a method, in accordance with an example embodiment, for mitigating congestion. In one example, the method 300 may be implemented by the congestion mitigation module 202 included in the congestion mitigation and avoidance module 105 depicted in FIG. 2. In reference to FIG. 3, the congestion mitigation module initially, at 302, monitors the congestion level of data flows. In one embodiment, the congestion mitigation module can monitor the congestion level based on Institute of Electrical and Electronics Engineers (IEEE) standard 802.1Qau. It should be appreciated that IEEE 802.1Qau provides a congestion notification that operates in the link layer. This congestion notification is in the form of a message that includes information about an extent of congestion along a particular path. A bridge, for example, can use the congestion notification to notify a source of the congestion. Accordingly, the congestion mitigation module can monitor the congestion level of a path, at 302, by receiving congestion notification messages from, for example, a switching apparatus.

In monitoring the congestion level, the congestion mitigation module can detect, at 304, the congestion level exceeding a certain threshold. This threshold can be predefined. Upon such an identification, the congestion mitigation module then, at 306, changes the flow identifier of a portion (e.g., at least one of a plurality) of the data flows to a different flow identifier.

As used herein, a "flow identifier" is a local representation of a path. Each flow identifier uniquely corresponds to (or implies) a specific path. Thus, the path followed by a data flow may be changed, by changing the flow identifier associated with that data flow. Put another way, if a flow identifier associated with a data flow is changed to a different flow identifier, this results in the data flow being redirected to a different path corresponding to the different flow identifier. Moreover, the same particular flow identifier may be associated with multiple data flows, resulting in each of the multiple data flows being redirected to the same path that corresponds to the same particular flow identifier.

In one example, the flow identifier comprises a combination of a source address and a non-zero flow label. Data packets sent to a particular destination but belonging to different flows may use different paths, with the choice of path depending on the flow identifier. As a result, by changing the flow identifier of a portion of the data flows to a different flow identifier, the portion of the data flows having a different flow identifier is redirected to flow along a different path. Moreover, flow identifiers associated with multiple data flows (e.g., multiple data flows in the flow 160 or in a portion of the flow 160) can be changed to multiple different flow identifiers, so that each of the multiple data flows are redirected to multiple different paths. Thus, the data flows to the congested path are reduced, thereby mitigating congestion.

Figure 4A:
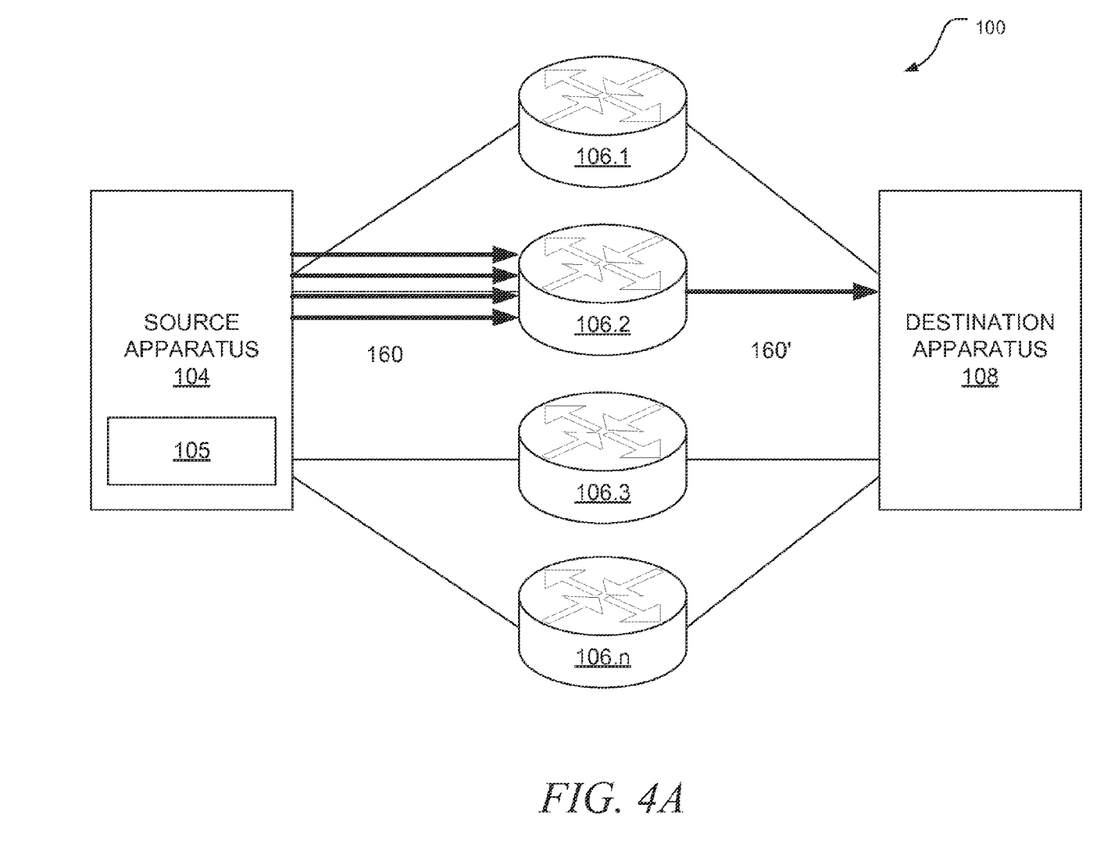
FIGS. 4A and 4B are block diagrams depicting the use of congestion mitigation in the network system.
Figure 4B:
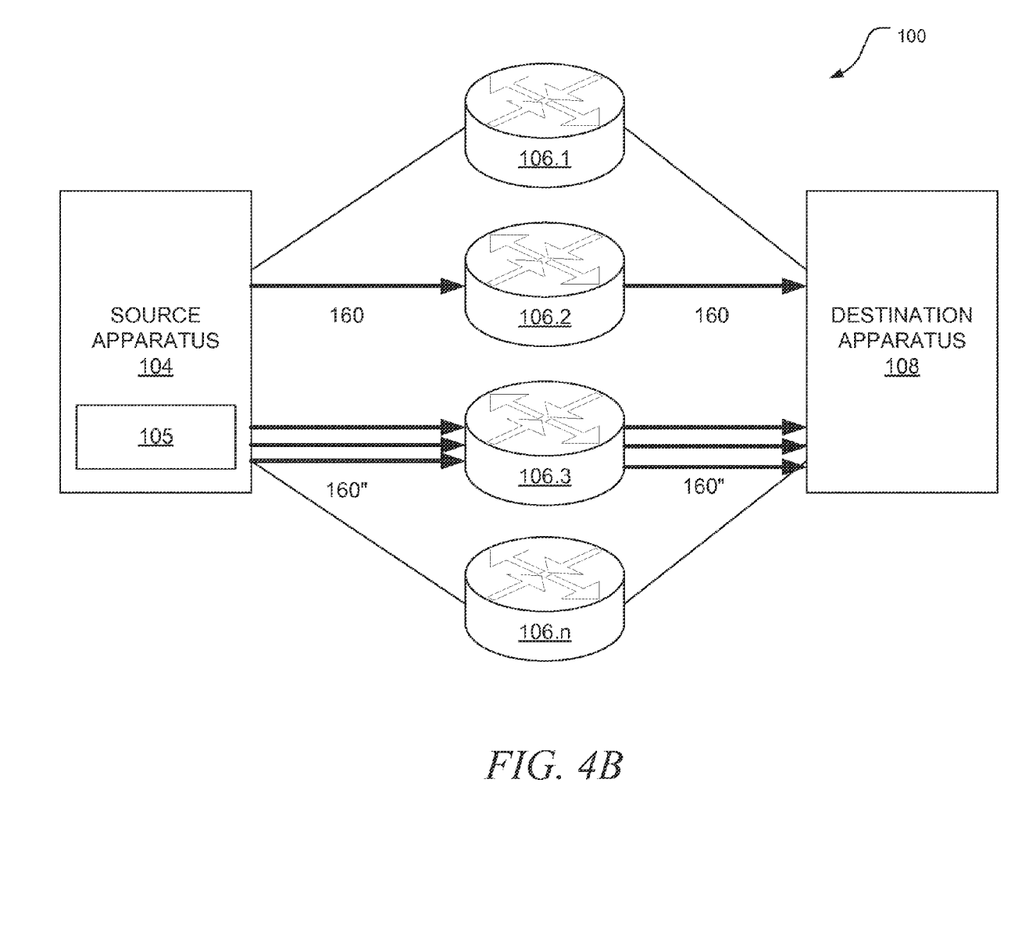

FIGS. 4A and 4B are block diagrams depicting the use of congestion mitigation in the network system 100. As discussed previously, the network system 100 includes edge apparatuses 104 and 108 and switching apparatuses 106.1-106.n. The source apparatus 104 is transmitting a flow of data packets 160 and 160 to the destination apparatus 108 by way of switching apparatus 106.2. However, the flow 160 through switching apparatus 106.2 is congested because, for example, the traffic aggregated on the switching apparatus 106.2 exceeds the throughput of the switching apparatus 106.2. As a result, as depicted in FIG. 4A, the flow 160' outputted from the switching apparatus 106.2 is less than the flow 160' inputted into the switching apparatus 106.2.

To mitigate congestion, the congestion mitigation and avoidance module 105 can redirect a portion of the flow 160 and 160'. In reference to FIG. 4B, the congestion mitigation and avoidance module 105 monitors the congestion levels of data flows, such as flow 160 from source apparatus 104, based on IEEE 802.1Qau. In particular, the source apparatus 104 receives periodic congestion notification messages from the switching apparatus 106.2 along path of the flow 160. As briefly discussed above, the congestion notification message includes information about the extent of congestion along the path. For example, the congestion notification message can include a congestion level of data flow 160. The congestion mitigation and avoidance module 105 can compare the congestion level to a certain threshold, which can be predefined. If the congestion level remains below this threshold level, the switching apparatus 106.2 is not congested and accordingly, the source apparatus 104 can continue to forward the same amount of data flow to the switching apparatus 106.2.

However, if the congestion mitigation and avoidance module 105 detects that the congestion level exceeds this threshold, then the congestion mitigation and avoidance module 105 can redirect a portion of the data flow 160 to one or more other switching apparatuses, such as switching apparatus 106.3. Still reaming to FIG. 4B, the congestion mitigation and avoidance module 105 can redirect the portion of the data flow 160 by changing the flow identifiers of a number of the data flows 160 to one or more different flow identifiers. Since the flow identifier is a local representation of a path, the change effectively redirects a number of the flows 160 to one or more different paths.

In the example depicted in FIG. 4B, the congestion mitigation and avoidance module 105 changes the flow identifiers of a number of data flow 160 to a different flow identifier that is associated with a different path routed by way of switching apparatus 106.3 rather than switching apparatus 106.2. By changing the flow identifier of data flow 160, the original dataflow 160 is split into two different data flows 160 and 160", with one flow 160 being routed through switching apparatus 106.2 while a second flow 160" being routed through switching apparatus 106.3. With a portion of the data flow 160 redirected to a different path, there is less dataflow 160 being transmitted to switching apparatus 106.2, thereby mitigating congestion in the network system 100.

It should be noted that the congestion mitigation and avoidance module 105 can select an alternate path to direct a portion of the dataflow using a variety of different techniques. For example, equal-cost multi-path routing (ECMP) can be used. ECMP is a forwarding mechanism for routing packets along multiple paths of equal cost with goal to achieve almost equally distributed link load sharing. If the source apparatus 104 uses ECMP, then the source apparatus 104 will have information on other ECMPs that do not go through the congested node (e.g., switching apparatus 106.2). The source apparatus 104 can select one or more of these other ECMP paths to carry a portion of the traffic. However, if the source apparatus 104 does not utilize ECMP, then the source apparatus 104 can select any unused ECMP that does not pass through the congested node. Alternatively, it is also possible to use other ECMPs that are already in use, but only use the unused ECMPs when all the ECMPs that are in use are congested.

By redirecting a portion of the data flow 160 to a different path, the destination apparatus 108 may receive the data packets out of sequence. To compensate, the congestion mitigation and avoidance module 105 can signal the end of transmission of data flow 160 along with congested path with an end marker, and signal the start of transmission of the data flows 160" along the new path with a start marker. This end marker effectively indicates the end of the transmission and can be a data packet that includes, for example, source information, destination information, and a flow identifier that may identify the congested path. The congestion mitigation and avoidance module inserts the end marker at the end of a transmission along the congested path. On the other hand, the start marker effectively indicates a start of the transmission and can be a data packet that includes, for example, source information, and destination information, and a flow identifier that may identify the new, non-congested path. The congestion mitigation and avoidance module inserts this start marker at the beginning of transmission of data flows along the non-congested path. It should however be noted that the data packet of the start marker and the end marker is not limited to include source information, destination information, and a flow identifier that may identify the congested path. In example embodiments, other data is also included.

Upon receipt of the start marker, the destination apparatus 108 can either drop or buffer the received data packets until it receives the end marker. If the destination apparatus 108 buffers the received data packets, the destination apparatus 108 transmits all the buffered packets upon receipt of the end marker. This mechanism of dropping or buffering the received data packets based on receipt of the start or an end marker ensures that there is no out of sequence delivery packets for a given dataflow should be noted that the out-of-sequence time period can be proportional to a difference of the one-way delay of the two paths, which is a small percentage of the one-way/round-trip delay of a path. The congestion threshold can be adjusted to reduce this past transition period. Since this methodology can leverage congestion information carried in existing unstressed and notification messages, thereby avoiding the introduction of any new control traffic into the core network system 100.

Figure 5:
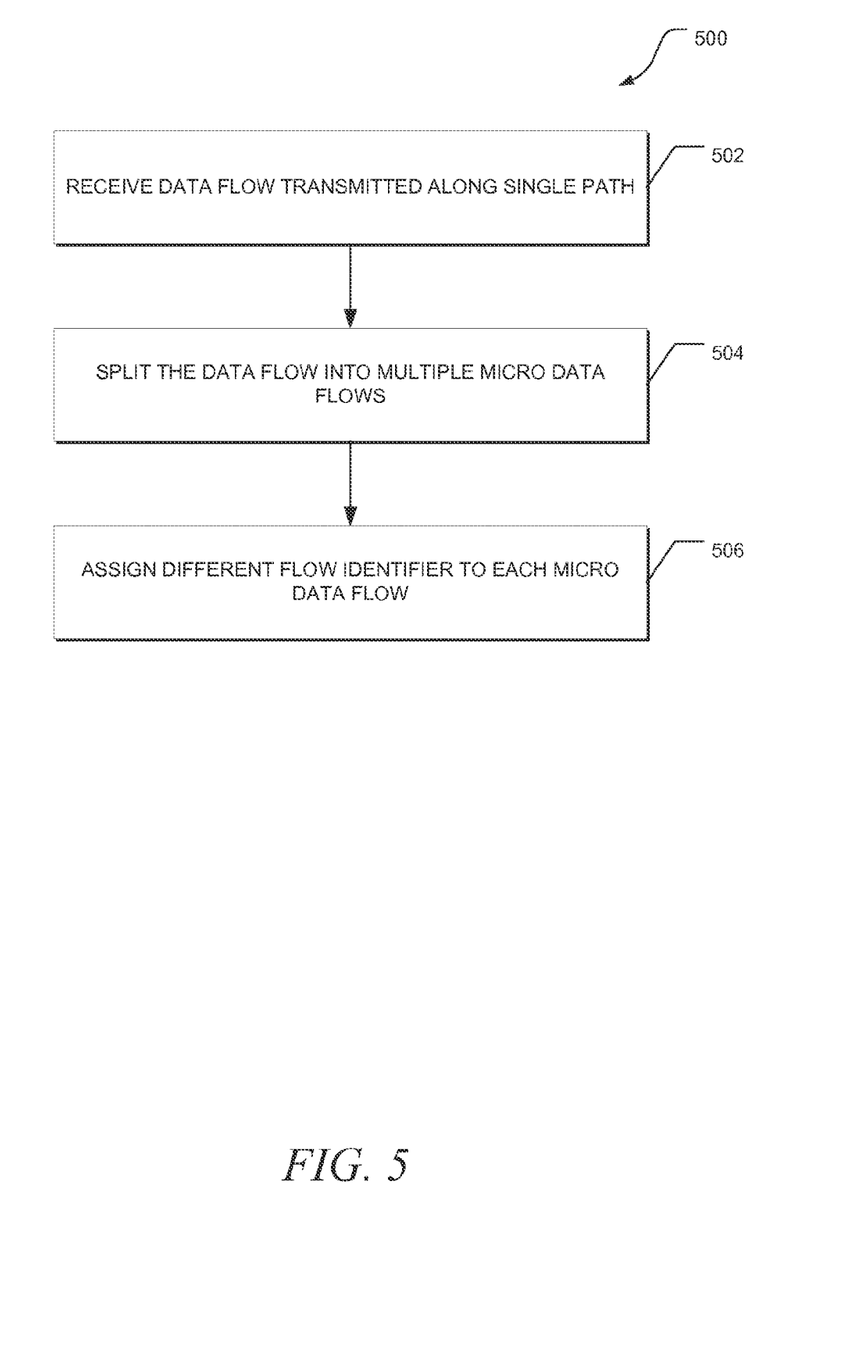
FIG. 5 is a flow diagram of a general overview of a method, in accordance with an example embodiment, for avoiding congestion.

FIG. 5 is a flow diagram of a general overview of a method 500, in accordance with an example embodiment, for avoiding congestion. In one example, the method 500 may be implemented by the congestion avoidance module 204 included in the congestion mitigation and avoidance module 105 depicted in FIG. 2. In reference to FIG. 5, the congestion avoidance module receives, at 502, a data flow transmitted along a single path. This data flow is to be forwarded to a destination apparatus.

Figure 6:
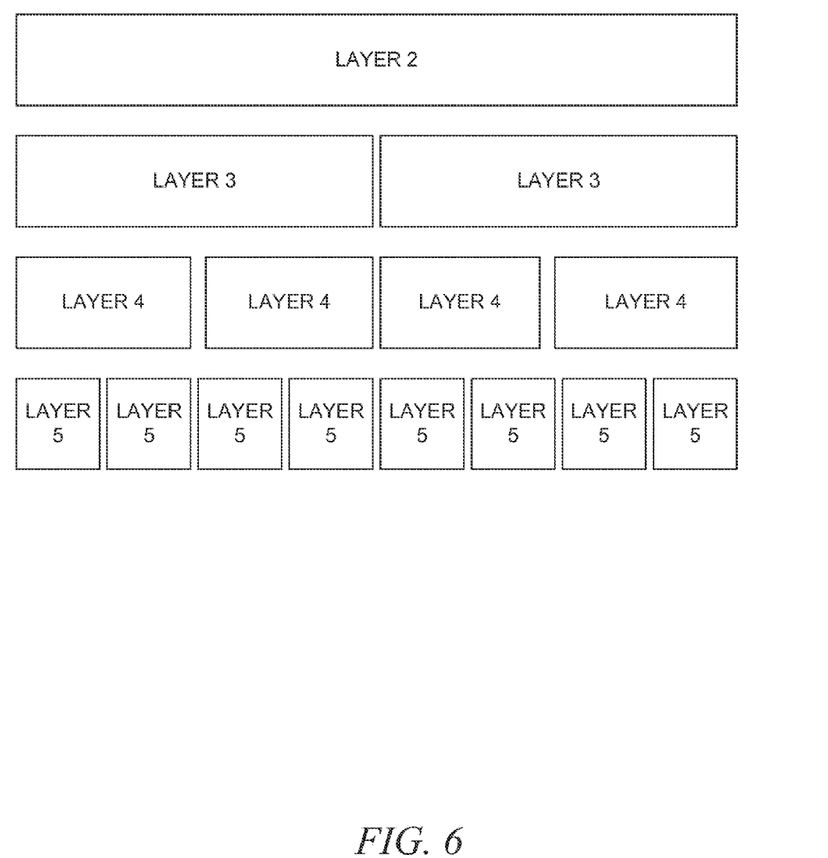
FIG. 6 is a block diagram depicting an Open Systems Interconnection (OSI) model.

Upon receipt of the data flow, the congestion avoidance module, at 504, splits this data flow into multiple micro data flows. As used herein, a "micro data flow" refers to a data flow that is transmitted along a higher layer, when compared to the original data flow, in an Open Systems Interconnection (OSI) model. As depicted in FIG. 6, the OSI model defines a networking framework for implementing protocols in seven layers. In particular, the OSI model includes at least, a data link layer (layer 2), a network layer (layer 3), a transport layer (layer 4), and a session layer (layer 5). Control is passed from one layer to the next, starting at, for example, layer 5, and proceeding to layer 2. Here, the data flow in layer 2 can be split into multiple micro data flows in layer 3, which is higher than layer 2. Similarly, the data flow in layer 3 can be split into multiple micro data flows in layer 4, which is higher than layer 3. In particular, for example, a data flow based on <ip-src, ip-dest> can be split into multiple micro data flows based on <ip-src/udp-port, ip-dest/udp-port>. For video/audio data flow, it can be further split based on <ip-src/udp-port/ssrc-id, ip-dest/udp-port/ssrc-id>. The congestion avoidance module can split the data flow by applying a variety of different functions, such as applying various hash functions.

An example method to split single data flow to multiple micro data flows is as follows. The flow <ip-src, ip-dst> may be split into multiple micro flows based on the <ip-src/port-src, ip-dst/port-dst> by port-src XOR port-dst MOD NumOfECMP. In this example embodiment, the micro data flow is assigned a number from 0 to (NumOfECMP−1). Based on the combination of port-src and port-dst, the micro-flows may be distributed among a number of ECMP between ip-src and ip-dst. It should however be noted various other methods may be used to split a single flow into multiple micro flows and that the aforementioned method is provided merely by way of example.

Returning to FIG. 5, the congestion avoidance module then, at 506, assigns a unique or different flow identifier to each micro data flow, thereby distributing the micro data flows to different data paths. The distribution and load balance of these micro data flows can be based on the same ECMP mechanism described above. Since a single data flow is split into multiple micro data flows that are distributed along multiple data paths, this redistribution thereby reduces the amount of data flows to a congested path while, at the same time, spreads portions of the data flow to different non-congested paths. Such a mechanism can be implemented in a network system without software/hardware upgrade to the switching apparatuses because this split is done at the source.

Figure 7:
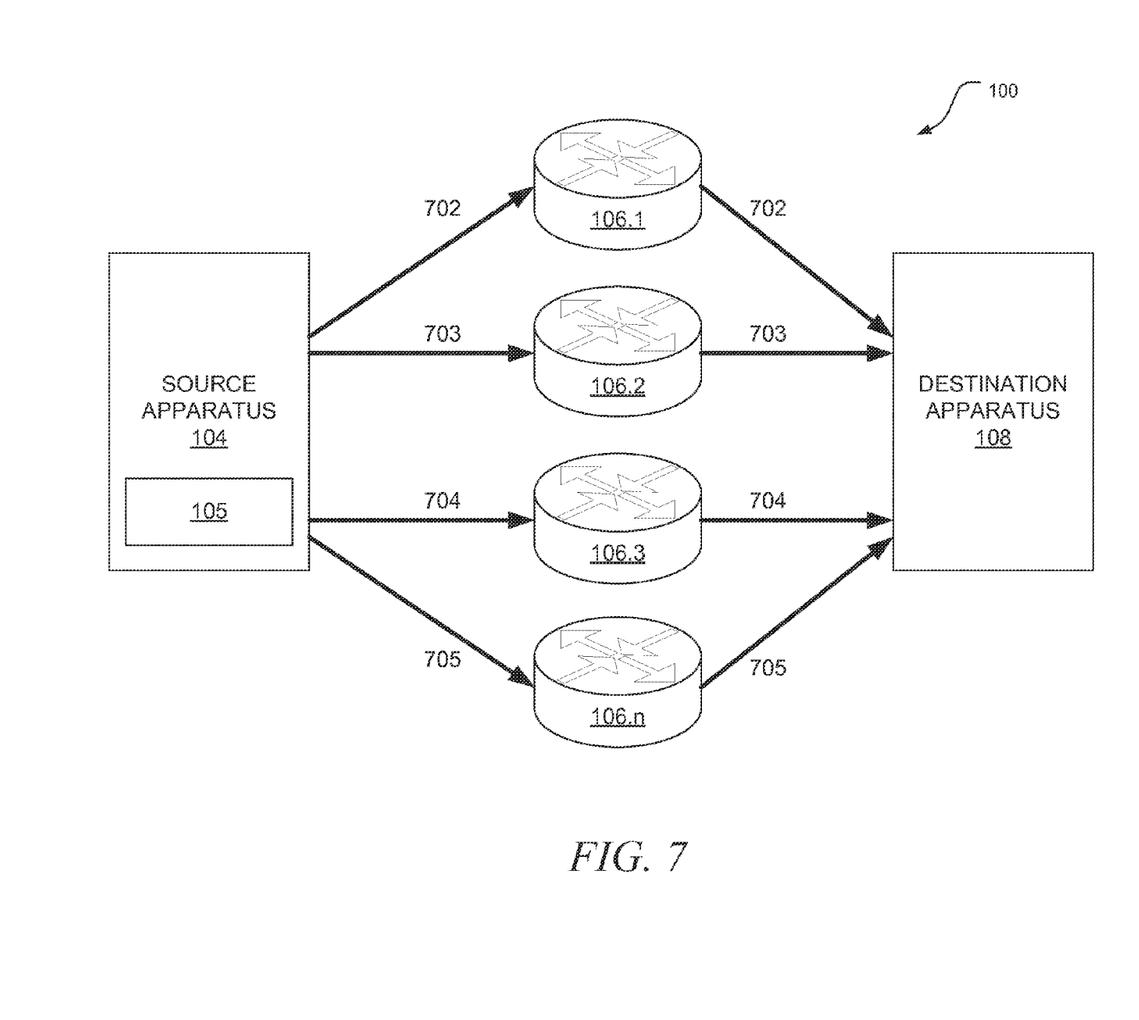
FIG. 7 is a block diagram depicting the use of congestion avoidance in the network system.

FIGS. 4A and 7 are block diagrams depicting the use of congestion avoidance in the network system 100. In reference to FIG. 4A, the source apparatus 104 is transmitting a flow of data packets 160 and 160' to the destination apparatus 108 by way of switching apparatus 106.2. However, the flow 160 through switching apparatus 106.2 is congested. As a result, as depicted in FIG. 4A, the flow 160' outputted from the switching apparatus 106.2 is less than the flow 160' inputted into the switching apparatus 106.2.

To avoid congestion, the congestion mitigation and avoidance module 105 can split the data flow 160 into multiple micro data flows 702-705, as depicted in FIG. 7. In reference to FIG. 7, the micro data flows 702-705, is evenly distributed to multiple paths rather than a single path by way of switching apparatus 106.2, which is congested. As a result, a single data flow is broken into sufficient granularity such that the multiple micro data flows 702-705 do not cause congestion in the first place.

Figure 8:
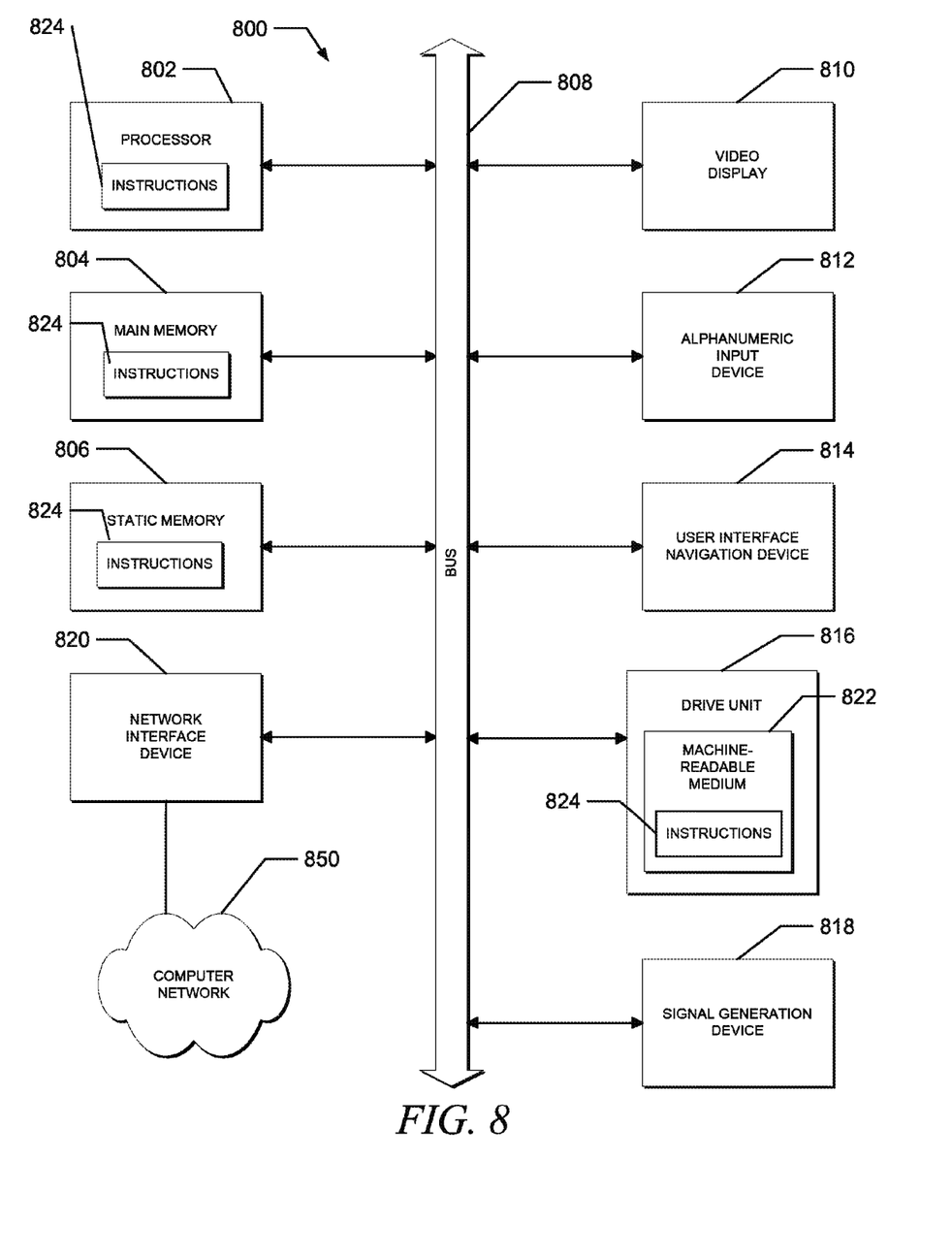
FIG. 8 is a block diagram of a machine in the example form of an apparatus within which may be executed a set of instructions for causing the machine to perform any one or more of the methodologies discussed herein.

FIG. 8 is a block diagram of a machine in the example form of an apparatus 800 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the apparatus 800 includes a processor 802 (e.g., a central processing unit (CPU), a graphics processing unit (GPU) or both), a main memory 804 (e.g., random access memory), and static memory 806 (e.g., static random-access memory), which communicate with each other via bus 808. The apparatus 800 may further include video display unit 810 (e.g., a plasma display, a liquid crystal display (LCD) or a cathode ray tube (CRT)). The apparatus 800 also includes an alphanumeric input device 812 (e.g., a keyboard), a user interface (UI) navigation device 814 (e.g., a mouse), a disk drive unit 816, a signal generation device 818 (e.g., a speaker), and a network interface device 820.

The disk drive unit 816 (a type of non-volatile memory storage) includes a machine-readable medium 822 on which is stored one or more sets of data structures and instructions 824 (e.g., software) embodying or utilized by any one or more of the methodologies or functions described herein. The data structures and instructions 824 may also reside, completely or at least partially, within the main memory 804 and/or within the processor 802 during execution thereof by apparatus 800, with the main memory 804 and processor 802 also constituting machine-readable, tangible media.

The data structures and instructions 824 may further be transmitted or received over a computer network 850 via network interface device 820 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the apparatus 800) or one or more hardware modules of a computer system (e.g., a processor 802 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 802 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 802 configured using software, the general-purpose processor 802 may be configured as respective different hardware modules at different times. Software may accordingly configure a processor 802, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 802 that are temporarily configured (e.g., by software) or permanently configured to perform the relevant operations. Whether temporarily or permanently configured, such processors 802 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 802 or processor-implemented modules. The performance of certain of the operations may be distributed among the one or more processors 802, not only residing within a single machine, but deployed across a number of machines. In some example embodiments, the processors 802 may be located in a single location (e.g., within a home environment, an office environment or as a server farm), while in other embodiments the processors 802 may be distributed across a number of locations.

While the embodiment(s) is (are) described with reference to various implementations and exploitations, it will be understood that these embodiments are illustrative and that the scope of the embodiment(s) is not limited to them. In general, techniques for collecting and categorizing configuration data may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method comprising:
   identifying, at a source device, a plurality of equal cost paths from the source device;
   establishing, at the source device, a data flow along a path of the plurality of equal cost paths and associating the data flow with a flow identifier, wherein the flow identifier is based on data associated with a first Open System Interconnection (OSI) model layer;
   monitoring, at the source device, a congestion level of the data flow along the path of the plurality of equal cost paths;
   in response to detecting that the congestion level exceeds a threshold, splitting the data flow into a first split flow and a second split flow;
   sending the first split flow along a first split flow path and sending the second split flow along a second split flow path;
   wherein splitting the data flow comprises splitting the data flow based on data associated with a second OSI model layer, wherein the second OSI model layer is higher in the OSI model than the first OSI model layer,
   wherein sending the first split flow along the first split flow path and sending the second split flow along the second split flow path comprises changing a flow identifier for at least one of the first split flow or the second split flow, and
   wherein the data flow is identified in OSI layer 3 based upon a combination of an Internet Protocol source address and an Internet Protocol destination address and the data flow is split at OSI layer 4 into the first split flow and the second split flow based on at least one of a User Datagram Protocol source port or a User Datagram Protocol destination port.

2. The method of claim 1, further comprising inserting a start marker at a beginning of transmission of the first split flow, the start marker indicating a start of the transmission of the first split flow.

3. The method of claim 2, wherein the start marker is a data packet that includes source information, destination information, and the different flow identifier.

4. The method of claim 1, further comprising inserting an end marker at an end of transmission of the first split flow, the end marker indicating the end of the transmission of the first split flow.

5. The method of claim 4, wherein the end marker is a data packet that includes source information, destination information, and the flow identifier.

6. The method of claim 1, wherein the monitoring of the congestion level comprises receiving a congestion notification message along the path of the plurality of equal cost paths, the congestion notification message including information about an extent of congestion along the path.

7. The method of claim 1, wherein the flow identifier consists of values associated with layer 2 of the Open System Interconnection (OSI) model and the split flow identifier comprises values associated with layer 3 of the OSI model.

8. Logic encoded on one or more non-transitory, tangible media and when executed cause operations to be performed, the operations comprising:
   identifying a plurality of equal cost paths from the source device;
   establishing a data flow along a path of the plurality of equal cost paths and associating the data flow with a flow identifier, wherein the flow identifier is based on data associated with a first Open System Interconnection (OSI) model layer;
   monitoring a congestion level of the data flow along the path of the plurality of equal cost paths;
   in response to detecting that the congestion level exceeds a threshold, splitting the data flow into a first split flow and a second split flow;
   sending the first split flow along a first split flow path and sending the second split flow along a second split flow path;
   wherein splitting the data flow comprises splitting the data flow based on data associated with a second OSI model layer, wherein the second OSI model layer is higher in the OSI model than the first OSI model layer,
   wherein sending the first split flow along the first split flow path and sending the second split flow along the second split flow path comprises changing a flow identifier for at least one of the first split flow or the second split flow, and
   wherein the data flow is identified in OSI layer 3 based upon a combination of an Internet Protocol source address and an Internet Protocol destination address and the data flow is split at OSI layer 4 into the first split flow and the second split flow based on at least one of a User Datagram Protocol source port or a User Datagram Protocol destination port.

9. The logic of claim 8, the operations further comprising inserting a start marker at a beginning of transmission of the first split flow, the start marker indicating a start of the transmission of the first split flow.

10. The logic of claim 9, wherein the start marker is a data packet that includes source information, destination information, and the different flow identifier.

11. The logic of claim 8, the operations further comprising inserting an end marker at an end of transmission of the first split flow, the end marker indicating the end of the transmission of the first split flow.

12. The logic of claim 11, wherein the end marker is a data packet that includes source information, destination information, and the flow identifier.

13. The logic of claim 8, wherein the operation of monitoring the congestion level comprises receiving a congestion notification message along the path of the plurality of equal cost paths, the congestion notification message including information about an extent of congestion along the path of the plurality of equal cost paths.

14. An apparatus comprising:
a congestion mitigation module located at a source device and comprising one or more processors and having instructions that when executed by the one or more processors cause the one or more processors to:
identify a plurality of equal cost paths from the source device;
establish a data flow along a path of the plurality of equal cost paths and associate the data flow with a flow identifier, wherein the flow identifier is based on data associated with a first Open System Interconnection (OSI) model layer;
monitor a congestion level of the data flow along the path of the plurality of equal cost paths, the data flow being associated with a flow identifier; and
in response to detecting that the congestion level exceeds a threshold, split the data flow into a first split flow and a second split flow; and
send the first split flow along a first split flow path and send the second split flow along a second split flow path;
wherein the instructions that cause the processor to split the data flow comprise instructions that cause the processor to split the data flow based on data associated with a second OSI model layer, wherein the second OSI model layer is higher in the OSI model than the first OSI model layer, wherein the instructions that cause the processor to send the data flow comprise instructions that cause the processor to send the first split flow and send the second split flow comprise instructions that change a flow identifier for at least one of the first split flow or the second split flow, and wherein the data flow is identified in OSI layer 3 based upon a combination of an Internet Protocol source address and an Internet Protocol destination address and the data flow is split at OSI layer 4 into the first split flow and the second split flow based on at least one of a User Datagram Protocol source port or a User Datagram Protocol destination port.

15. The apparatus of claim 14, wherein the instructions further cause the one or more processors to insert a start marker at a beginning of transmission of the first split flow, the start marker indicating a start of the transmission of the first split flow.

16. The apparatus of claim 15, wherein the start marker is a data packet that includes source information, destination information, and the different flow identifier.

17. The apparatus of claim 14, wherein the instructions further cause the one or more processors to insert an end marker at an end of transmission of the first split flow, the end marker indicating the end of the transmission of the first split flow.

18. The apparatus of claim 17, wherein the end marker is a data packet that includes source information, destination information, and the flow identifier.

19. The apparatus of claim 14, wherein the instructions which cause the one or more processors to monitor the congestion level further cause the one or more processors to receive a congestion notification message along the path of the plurality of equal cost paths, the congestion notification message including information about an extent of congestion along the path of the plurality of equal cost paths.

20. The apparatus of claim 14, wherein the flow identifier consists of values associated with layer 2 of the Open System Interconnection (OSI) model and the split flow identifier comprises values associated with layer 3 of the OSI model.

* * * * *